United States Patent Office 3,495,110
Patented Feb. 10, 1970

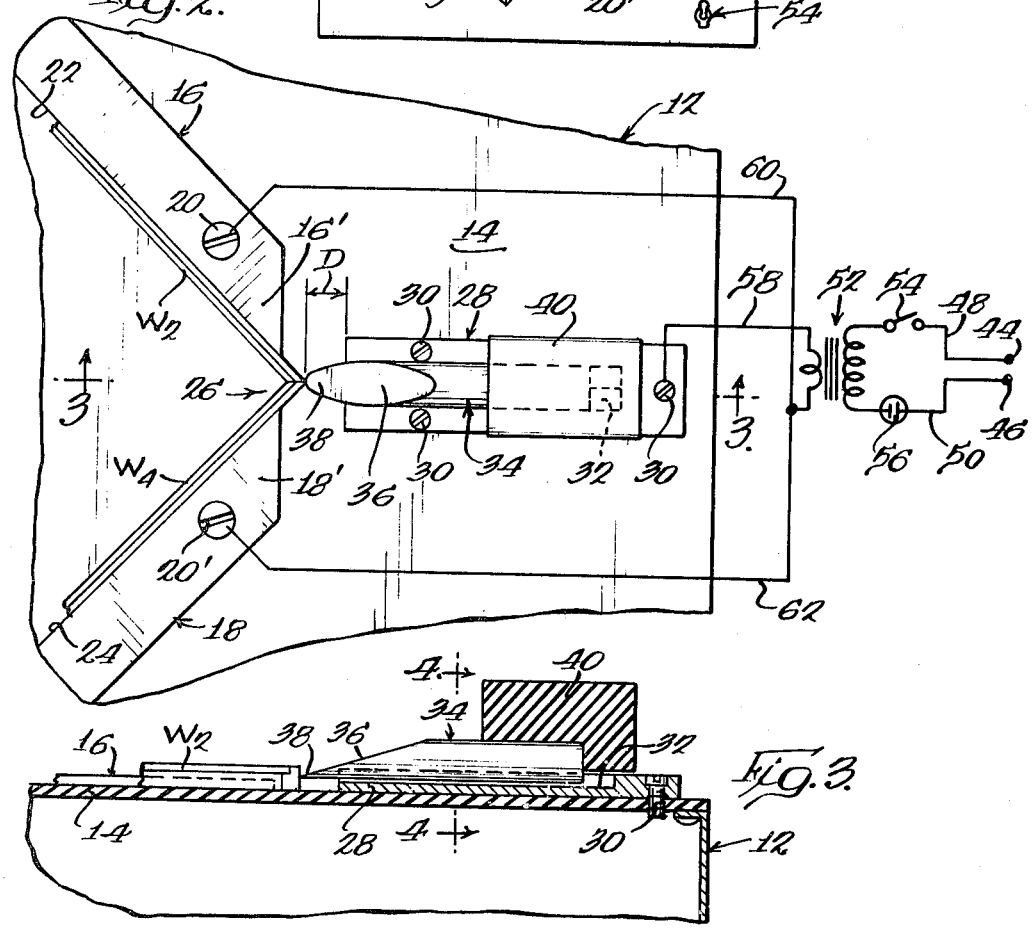

3,495,110
WELDING DEVICE
John F. Meinardi, Spring Valley, Ill., assignor to Graphic Electronics, Inc., La Salle, Ill., a corporation of Delaware
Filed Mar. 4, 1966, Ser. No. 531,994
Int. Cl. B23k 9/02, 9/24, 11/30
U.S. Cl. 219—101                      13 Claims

ABSTRACT OF THE DISCLOSURE

A welding device for fabricating border assemblies from rectilinear border elements including a pair of electrically conductive guide members which are secured to the top of a work surface and against which border elements to be welded are manually positioned preparatory to a welding operation, the guide members being connected to one side of an electric circuit, and an electrode member connected to the other side of the circuit and movable into engagement with the border elements where the latter abut one another so as to heat up the border elements and fuse or weld the same together to form a corner joint.

---

The present invention relates to a small portable electric arc welding device particularly adapted for use in the printing arts where in the setting of type and other relief elements it is necessary to connect together the ends of a plurality of border elements so as to fabricate a border assembly or box which will fit around type or the like and provide a border or frame therefor.

In the assembling of relief elements such as lines of type and engravings, as for example in a paste-up process such as described in the copending application of John N. Barron, Ser. No. 464,723, filed June 17, 1965, now Patent No. 3,327,400 for setting up a newspaper advertisement which is ultimately to be reproduced from a press plate or other conventional printing apparatus, it is often necessary to fabricate a border assembly which fits around portions of the type, and such a border is normally fabricated from small rectilinear strips or bars of lead type metal. Such borders will vary in size from job to job and thus must be fabricated manually to suit the particular job at hand.

The above-described type borders commonly comprise rectangular border assemblies or boxes fabricated from four rectilinear border elements made of lead type metal and having beveled end portions, such border elements being joined together at their ends to form a rectangular border assembly having four miter joints at the corners thereof. Accordingly, four separate joining operations as by soldering or welding or the like are necessary in order to construct a single rectangular border assembly, and thus the fabrication of the necessary borders is a relatively time consuming part of the overall task of assembling a plurality of relief elements in accordance with a predetermined layout.

It is therefore an object of the present invention to provide an improved electric arc welding device for positioning a pair of rectilinear border elements perpendicular to one another with their respective ends abutted so as to define a corner of a border assembly and for welding such elements together at such corner in a simple and efficient manner.

Other objects and advantages of the invention will be apparent from the following description of a preferred embodiment thereof.

Now, in order to acquaint those skilled in the art with the manner of making and using my invention, I shall describe, in conjunction with the accompanying drawings, the best mode contemplated by me for carrying out the invention.

In the drawings:
FIGURE 1 is a top plan view showing a welding device constructed in accordance with the present invention, and further showing a plurality of border elements disposed on a table portion of the welding device prior to the final positioning and welding of such border elements;
FIGURE 2 is an enlarged fragmentary top plan view of the welding device of FIGURE 1 showing the relative positions of a carbon electrode member and a pair of border elements to be welded during a welding operation, there being shown schematically the electrical wiring for the welding device;
FIGURE 3 is a fragmentary vertical sectional view take substantially along the line 3—3 of FIGURE 2; and
FIGURE 4 is a fragmentary vertical sectional view, taken substantially along the line 4—4 of FIGURE 3, showing the manner in which a carbon electrode member rests in an arcuate groove formed in an electrode plate member.

Referring now to the drawings, there is shown a welding device 10 comprising a housing 12 the upper surface of which constitutes a work surface or table 14 on which a plurality of border elements W are positioned. A pair of contact plates 16 and 18 are secured to the table surface 14 by means of a plurality of bolts 20 and 20', respectively, and such contact plates have respective inner side edge portions 22 and 24 which function as aligning or guide means for holding a pair of border elements W in a position to be welded. The contact plates 16 and 18 are oriented so that the guide surfaces 22 and 24 define a right angle therebetween, and their adjacent end portions 16' and 18' are spaced apart to provide a space or opening therebetween as indicated at 26.

A pair of rectilinear border elements such as shown at $W_2$ and $W_4$ in FIGURE 2 are positioned for welding by placing one element against the guide surface 22 of the contact plate 16 and the other element against the guide surface 24 of the contact plate 18, the border elements being positioned by the guide surfaces so as to be perpendicular to one another. Such border elements are located along the respective guide surfaces so that the beveled ends thereof engage one another and define a mitered corner for a border assembly. Moreover, it will be seen from FIGURE 2 that when a pair of border elements are positioned for a welding operation, the ends thereof to be welded extend beyond the ends of the contact plates 16 and 18 so as to project through the space 26, and in this manner the corner defined by such border elements is fully exposed for engagement by a carbon electrode member as will be described hereinbelow.

A contact plate electrode member 28 is secured to the table surface 14 by a plurality of bolts or screws or the like 30, and the electrode plate 28 is oriented so that its longitudinal axis approximately bisects the right angle defined by the inner guide surfaces 22 and 24 of the pair of contact plates 16 and 18. It will further be seen from FIGURE 2 that when a pair of border elements $W_2$ and $W_4$ are positioned on the table surface 14 with their ends abutted so as to form a mitered corner for welding, the adjacent end of the electrode plate 28 is spaced a short distance D from such corner. The electrode plate 28 has a longitudinal groove 32 (see FIGURE 4) formed on the top surface thereof, and such groove extends from the extreme left hand end of the plate 28 as viewed in FIGURE 2 toward the right hand end thereof. In the embodiment shown the groove 32 terminates short of the extreme right hand end of the plate 28, but it may if desired run for the full length of the plate.

The longitudinal groove 32 in the contact plate 28 is intended to cooperate with a carbon electrode member in the form of a cylindrical carbon rod 34 the outer end of which is beveled on its upper surface as at 36 to form a relatively thin tip portion 38. The carbon rod 34 is mounted in a holding block 40 having an arcuate groove 42 formed in the bottom surface thereof. The holding block 40 is made of wood or other suitable insulating material, and the groove 42 is dimensioned so that the underside of the carbon rod will project beyond the bottom surface of the block an amount so as to engage in the groove 32 and maintain the holding block 40 spaced slightly above the plate 28 (see FIGURE 4). The longitudinal groove 32 in the contact plate 28 has an arcuate configuration corresponding approximately to the contour of the carbon rod 34, and in order to perform a welding operation the carbon rod 34 is intended to be positioned in the groove 32 and moved therealong toward the border elements to be welded until the thin tip portion 38 of the carbon engages against the abutted ends of the border elements directly where the latter meet to define a mitered corner. In this manner, as will be explained more fully hereinbelow, a welded corner joint is formed by heating the adjacent ends of the border elements and fusing the same together.

As shown in FIGURE 2, a power source is represented by a pair of terminals 44 and 46, and a pair of leads 48 and 50 from the power source are connected to the input terminals of a step down transformer 52 which may for example have an output of approximately 6 volts. A manually operable on-off switch 54 is provided in the line 48, and an indicator light 56 is connected in the line 50. One lead 58 from the output side of the transformer 52 is connected to the electrode plate 28 in any suitable manner such as by connecting the lead to one of the fastening screws 30 which contact the plate. The other transformer output terminal is connected by leads 60 and 62 to the contact plates 16 and 18, respectively, the leads being disposed inside of the housing 12 along with the transformer 52, and the leads being connected to respective fastening bolts or the like 20 and 20' which in turn are in contact with the plates 16 and 18.

It will be understood from the foregoing that the two aluminum contact plates 16 and 18 carry one pole from the transformer 52 so as to be on one side of the electric circuit while the contact plate electrode member 28 carries the other pole from the transformer so as to be on the other side of the circuit. Moreover, the border elements to be welded such as the elements W₂ and W₄ are held in engagement with the contact plates 16 and 18 respectively preparatory to a welding operation and thus pick up the pole from the latter plates. Accordingly, with the pair of elements to be welded positioned as shown in FIGURE 2, the carbon rod electrode member 34 is positioned in the longitudinal groove 32 formed in the electrode plate 28, and, by gripping the mounting block 40, the carbon electrode is manually moved along the groove 32 until the thin tip portion 38 of the carbon comes into contact with the corner defined by the abutted ends of the border elements W₂ and W₄. Because the longitudinal axis of the groove 32 in the electrode plate 28 bisects the right angle defined by the inner guide surfaces 22 and 24 of the contact plates 16 and 18, the groove 32 will guide the carbon electrode 34 into accurate engagement with the abutted ends of the border elements. Thus, the operator need only hold the pair of border elements against the plates 16 and 18 as shown in FIGURE 2 and slide the carbon electrode 34 along the groove 32 until the carbon engages the border elements thereby instantly heating up the ends of the border elements and fusing the same together to form a welded mitered corner joint.

The foregoing welding operation is completed substantially immediately upon engagement of the carbon electrode with the elements to be welded, and thus there is no wasted time waiting for the elements to heat up and fuse. Moreover, no welding wire or the like is required and the operation can be performed quite simply by a single operator without need for clamping the border elements in position for welding. It will be understood that a welding operation as described above can be repeated four times in order to weld four corner joints and thereby form a rectangular border assembly or box from four rectilinear border elements such as the elements $W_1$, $W_2$, $W_3$ and $W_4$ shown in FIGURE 1.

The welding device of the present invention is simple and inexpensive to construct and yet is extremely useful since it greatly facilitates the positioning of the border elements to be welded while exposing the mitered corner joint defined by the abutted ends of such elements, and by providing means for guiding the carbon electrode 34 directly into engagement with the corner joint. The carbon electrode 34 is made one side of an electric circuit, while the border elements to be welded, due to their engagement with the plates 16 and 18, are made the other side of the circuit, and the weld takes place substantially immediately upon making contact between the two. The welding device described herein is particularly useful in conjunction with a method and apparatus for a relief paste-up process as described in the earlier mentioned copending application of John N. Barron, Ser. No. 464,723, filed June 17, 1965, and assigned to the assignee of the present invention.

It is important to understand that terms such as "welder," "welding" and "arc welding" are used herein and in the appended claims in a broad sense, since no welding wire or the like is fused into the corner joint defined by the border elements W. The border elements W which are made of type metal or lead or the like are made one side of the electric circuit, while the carbon electrode 34 through its engagement with the electrode plate 28 is made the other side of the circuit. Consequently, when the carbon 34 is slid along the plate 28 until the carbon engages the elements W at the corner defined thereby, the tip of the carbon immediately heats up and fuses the ends of the type metal border elements together to produce a corner joint referred to herein and in the appended claims as a "welded" joint.

While I have described my invention in a preferred form, I do not intend to be limited to such form, except insofar as the appended claims are so limited, since modifications within the scope of my invention will readily occur to those skilled in the art, particularly with my disclosure before them.

I claim:
1. In an electric welding device for use in the fabrication of border assemblies from rectilinear border elements made of type metal or the like, the improvement comprising, in combination, a work surface, a pair of electrically conductive guide members each having a rectilinear guide surface, said guide members being secured to the top of said work surface and positioned in converging relation thereon so that said pair of guide surfaces define a predetermined angle therebetween whereby a pair of rectilinear border elements may be positioned on said work surface and against said guide surfaces with the ends of said border elements approximately abutted to define a corner joint for a border assembly to be fabricated, means for connecting one side of an electric circuit to said conductive guide members with which said pair of border elements are in contact, and electrode means connected to the other side of said circuit and spaced from said guide members for engaging said border elements at said corner thereby causing said electrode to heat up and fuse said border elements together to effect welding of said corner joint, said electrode means being positioned approximately in a working plane defined by said pair of border elements which working plane is substantially parallel to the plane of said work surface, and said electrode means being located in the area of the converging ends of said guide surfaces for movement substantially along a path in said working plane for engaging said border elements at said corner.

2. The invention of claim 1 wherein said pair of conductive guide members are positioned relative to one another so that said guide surfaces define an angle of approximately 90 degrees therebetween.

3. The invention of claim 1 wherein the converging ends of said pair of conductive guide members are spaced apart to define an opening therebetween whereby when a pair of border elements are held against said guide surfaces with their ends in approximate abutting relation to define a corner joint for a border assembly to be fabricated, said ends of said border elements will extend beyond said ends of said guide members thereby exposing said corner joint for engagement by said electrode means.

4. The invention of claim 1 wherein said electrode means comprises an electrically conductive electrode member fixedly secured to said work surface in spaced relation to said conductive guide members and connected to said other side of said circuit, and a movable electrode member engageable with said fixed electrode member and movable therealong into engagement with said border elements for welding the latter at said corner joint.

5. The invention of claim 4 wherein said fixed electrode member includes guide means for guiding said movable electrode member into accurate engagement with said corner joint.

6. The invention of claim 4 wherein said movable electrode member comprises a carbon electrode.

7. In an electric welding device for use in the fabrication of border assemblies from rectilinear border elements made of type metal or the like, the improvement comprising, in combination, a work surface, a pair of electrically conductive guide members each having a rectilinear guide surface, said guide members being secured to the top of said work surface and positioned thereon so that said pair of guide surfaces define an angle of approximately 90 degrees therebetween whereby a pair of rectilinear border elements may be positioned on said work surface and against said guide surfaces with the ends of said border elements approximately abutted to define a right angle corner joint for a border assembly to be fabricated, the converging ends of said pair of conductive guide members being spaced apart to define an opening therebetween whereby said ends of said border elements will extend beyond said ends of said guide members thereby exposing said corner joint, means for connecting one side of an electric circuit to said conductive guide members with which said pair of border elements are in contact, an electrically conductive electrode member fixedly secured to said work surface in spaced relation to said conductive guide members and connected to the other side of said electric circuit, and a movable electrode member engageable with said fixed electrode member and movable therealong into engagement with said border elements for welding the latter at said corner joint, said fixed electrode member including guide means for guiding said movable electrode member into accurate engagement with said corner joint, said movable electrode member being positioned in a working plane defined by said pair of border elements which working plane is substantially parallel to the plane of said work surface, and said movable electrode member being located in the area of the converging ends of said guide surfaces for movement substantially along a path in said working plane for engaging said border elements at said corner.

8. The invention of claim 7 wherein said movable electrode member comprises a carbon electrode.

9. The invention of claim 7 wherein said guide means comprises a groove formed on the top surface of said fixed electrode member, said groove being located so that a longitudinal axis thereof approximately bisects said angle defined between said pair of guide surfaces, and said movable electrode member being movable in said groove toward said corner joint to effect the welding thereof.

10. In an electric welding device for use in the fabrication of border assemblies from rectilinear border elements made of type metal or the like, the improvement comprising, in combination, a work surface, a pair of electrically conductive guide plates each having a rectilinear guide surface, said guide plates being secured to the top of said work surface and positioned thereon so that said pair of guide surfaces define an angle of approximately 90 degrees therebetween whereby a pair of rectilinear border elements may be positioned on said work surface and against said guide surfaces with the ends of said border elements approximately abutted to define a right angle corner joint for a border assembly to be fabricated, the converging ends of said pair of conductive guide plates being spaced apart to define an opening therebetween whereby said ends of said border elements will extend beyond said ends of said guide plates thereby exposing said corner joint, means for connecting one side of an electric circuit to said conductive guide plates with which said pair of border elements are in contact, an electrically conductive electrode plate fixedly secured to said work surface in spaced relation to said conductive guide plates and connected to the other side of said electric circuit, said fixed electrode plate having a groove formed in the top surface thereof and said groove being located so that the longitudinal axis thereof approximately bisects said angle defined between said pair of guide surfaces, and a carbon electrode member engageable with said fixed electrode member and movable in said groove into engagement with said border elements for welding the latter at said corner joint, said carbon electrode member being positioned approximately in a working plane defined by said pair of border elements which working plane is substantially parallel to the plane of said work surface, and said carbon electrode member being located in the area of the converging ends of said guide surfaces for movement substantially along a path in said working plane for engaging said border elements at said corner.

11. The invention of claim 10 wherein said carbon electrode member comprises a cylindrical carbon rod mounted in a holding member to permit manual sliding of said carbon electrode along said groove, said carbon electrode having a thin tip portion for engagement with said border elements at said corner joint.

12. A method of fabricating a border assembly by joining the ends of a plurality of rectilinear border elements made of type metal or the like, said method comprising the steps of positioning a pair of rectilinear border elements on a work surface and holding said pair of rectilinear border elements against a pair of electrically conductive guide means which are connected to one side of an electric circuit, positioning said border elements so that the ends thereof abut to define a corner joint for the border assembly, connecting a carbon electrode member with the other side of said electric circuit, and moving said carbon electrode member so that one end thereof contacts said border elements at said corner joint thereby fusing the ends of said border elements together and producing a welded corner joint, said carbon electrode member being positioned approximately in a working plane defined by said pair of border elements which working plane is substantially parallel to the plane of said work surface, and said carbon electrode member being located in the area of the ends of said guide means and being moved substantially along a path in said working plane into engagement with said border elements at said corner.

13. The method of claim 12 where said border elements are positioned so as to define a right angle therebetween, and where said carbon electrode member is moved approximately along a line which bisects said right angle, said electrode member being moved into engagement with said border elements at the outside of said corner joint.

(References on following page)

References Cited

UNITED STATES PATENTS

| | | | |
|---|---|---|---|
| 1,744,062 | 1/1930 | Taylor | 219—101 |
| 1,546,250 | 7/1925 | Philips | 219—158 |
| 1,604,181 | 10/1926 | Lincoln | 219—137 |
| 2,380,054 | 7/1945 | Lautmann | 219—78 |
| 2,652,473 | 9/1953 | Gordon et al. | 219—101 X |

FOREIGN PATENTS 25,108　11/1935　Australia.

JOSEPH V. TRUHE, Primary Examiner

J. G. SMITH, Assistant Examiner

U.S. Cl. X.R.

219—119